May 2, 1961 E. S. HORRES 2,982,489

CONTINUOUS TAPE RECORDER AND SOUND REPRODUCER

Original Filed Nov. 13, 1953 2 Sheets-Sheet 1

INVENTOR.
EUGENE S. HORRES
BY
Albert J. Kramer
ATTORNEY

May 2, 1961 E. S. HORRES 2,982,489

CONTINUOUS TAPE RECORDER AND SOUND REPRODUCER

Original Filed Nov. 13, 1953 2 Sheets-Sheet 2

INVENTOR.
EUGENE S HORRES
BY
Albert J. Kramer
ATTORNEY

United States Patent Office 2,982,489
Patented May 2, 1961

2,982,489

CONTINUOUS TAPE RECORDER AND SOUND REPRODUCER

Eugene S. Horres, Charleston, S.C., assignor to Audio-Mechanical Devices, Inc., a corporation of Maryland Substituted for abandoned application Ser. No. 391,792, Nov. 13, 1953. This application Jan. 15, 1958, Ser. No. 709,081

3 Claims. (Cl. 242—55.19)

This application is a substitute for abandoned application Ser. No. 391,792, filed November 13, 1953.

My invention relates to tape recorders and reproducers, and included in the objects of my invention are:

First, to provide a tape recorder wherein the recording tape is endless, and which incorporates a novel reel capable of holding an unusually large footage of tape and so arranged that the tape may be unwound from the radially inner portion of the reel while being wound upon the external portion of the reel, without exerting more than nominal tension on the tape.

Second, to provide a novel reel for endless tapes or ribbons which is applicable not only to sound recording tapes but is applicable to motion picture film or the like.

Third, to provide a tape recorder wherein the tape or ribbon may be permanently mounted in a magazine, the magazine being so arranged that it may be placed in a recording or reproducing machine or removed without necessitating any handling or threading of the tape.

Fourth, to provide a tape recorder which incorporates a simple and effective drive means for the tape which insures uniform tape travel, and which permits ready insertion and removal of the tape magazine.

With the above and other objects in view, as may appear hereinafter, reference is directed to the accompanying drawings in which.

Figures 1, 2, 3, 4:
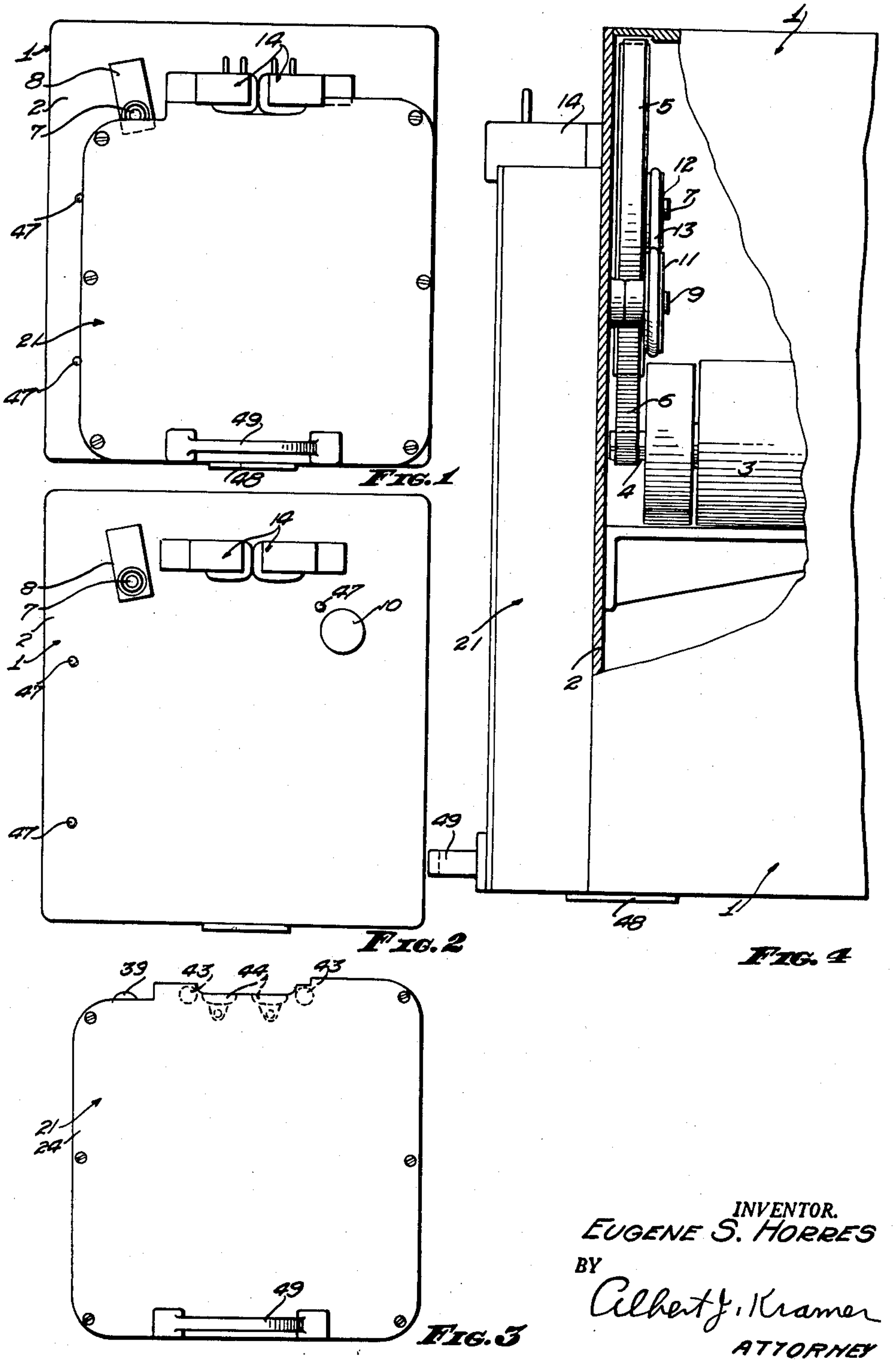
Fig. 1 is a top or plan view of my tape recorder, showing the amplifier case and magazine in position thereon.
Fig. 2 is a similar plan view of the amplifier case with the magazine removed.
Fig. 3 is a similar view of the tape magazine removed from the amplifier case.
Fig. 4 is an enlarged fragmentary side view of the tape recorder with a portion of the amplifier case broken away to show the drive mechanism.
Figures 5, 6:
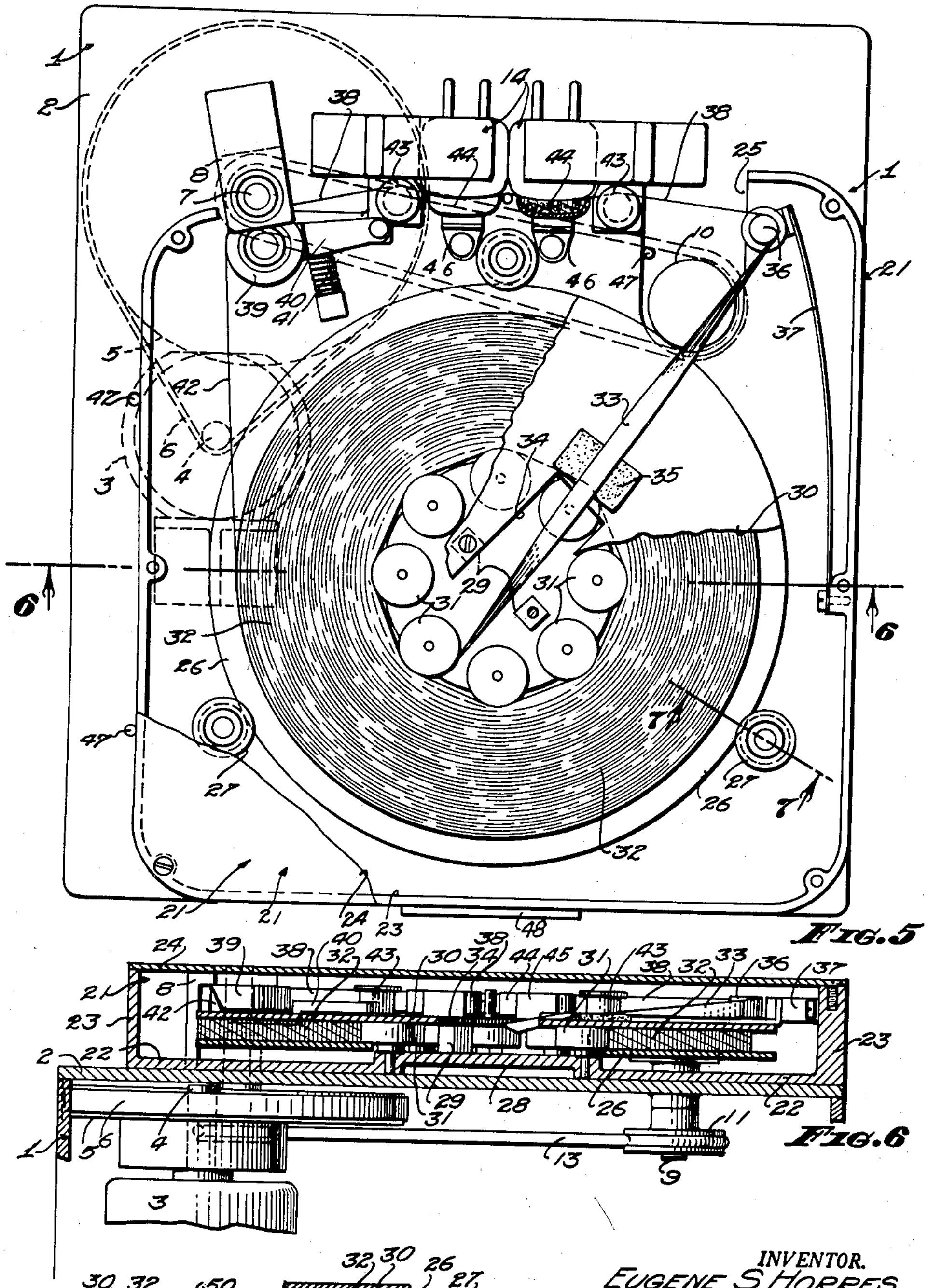
Fig. 5 is an enlarged plan view of the tape recorder, showing the tape magazine cover and other portions broken away to facilitate the illustration.
Fig. 6 is a transverse sectional view substantially through 6—6 of Fig. 5.

My tape recorder includes an amplifier case 1 which may be rectangular in form and provided with a top deck 2. Supported from the top deck 2 is a motor 3 having a drive wheel 4 connected to a driven wheel 5 located under one corner of the top deck. A belt 6 joins the wheels 4 and 5. The driven wheel 5 is provided with a central spindle 7 which extends upwardly through a suitable bearing fitted in the top deck 2 and terminates in a second bearing supported by a bracket 8 extending upwardly from the top deck. As will be brought out hereinafter, the spindle 7 drives the recording tape.

Located laterally from the driven wheel 5 is a reel driving shaft 9, journalled in a suitable bearing provided in the top deck 2. The upper exposed end of the reel driving shaft 9 is provided with a reel driving wheel 10. The lower end of the shaft 9 is provided with a pulley 11 which is connected to a pulley 12 coaxial with the driven wheel 5 by a belt 13.

Mounted on the top deck near one end and between the tape driving spindle 7 and reel driving shaft 9 is a pair of magnetic tape recording playing and erasing units 14, which include solenoid coils and armatures so disposed as to vary the magnetic characteristics of a magnetizable tape passed across the operating extremities thereof. These units may be considered as conventional.

A tape magazine 21 is adapted to be removably mounted on the amplifier case 1. The tape magazine is in the form of a shallow rectangular box, including a bottom 22, edge walls 23, and a removable cover 24. One edge, which embraces the region between the tape driving spindle 7 and the reel driving shaft 9, is open, in addition the bottom 22 may have a notch, as indicated by 25, to accommodate the reel-driving wheel 10.

Within the tape magazine adjacent the bottom 22 is a rotatable disc 26 which is supported at its outer periphery by three grooved supporting wheels 27. The upper surface of the disc 26 is highly polished and flat, that is, free of projections of any kind. The rotatable disc 26 is provided with a central aperture and within the area of this aperture the bottom 22 is raised to form a boss or platform 28. Extending upward from the boss 28 is a pair of posts 29 which support a fixed reel disc 30 overlying the rotatable disc 26. The periphery of the boss supports a ring of tape-rotating wheels 31, the radially outer peripheries of which overlie the inner margin of the rotatable disc 26. Wound spirally on the rotatable disc 26 around the ring of wheels 31 is a substantial length of magnetic recording tape 32 with its lower edge resting on the polished surface of disc 26. The spiral winding of tape may be several inches in radial thickness and constitute several hundred convolutions.

The tape unwinds from between a pair of the wheels 31 and forms a discharge reach 33 which extends diametrically across the upper or fixed reel disc 30 through a slot 34 formed in the disc. This reach of the tape may pass over a pad 35. The tape is so twisted that its "reverse" or uncoated face engages the pad 35. Pad 35 is impregnated with a suitable lubricant, such as powdered graphite, a small amount of which is deposited on the uncoated face of the tape as it slides thereover. The extended end of the reach 33 terminates at a tension pulley 36 located adjacent a corner of the tape magazine at one extremity of the open side wall. The tension pulley 36 is supported by a leaf spring 37 secured to an edge wall 23 of the tape magazine. An active reach 38 extends between the pulley 36 and an idler wheel 39 which bears against the tape-driving spindle 7 when the magazine is in position on the amplifier case. The idler wheel is carried by a lever arm 40 which is engaged by a spring 41 to hold the idler wheel in yieldable contact with the tape-driving spindle 7. A return reach 42 of the tape extends between the idler wheel 39 and the outer circumference of the spiralled tape 32.

The active reach 38 of the tape passes over a pair of guide rollers 43 located at the remote sides of the pair of recording and erasing units 14. The guide rollers 43 are so positioned that when the tape magazine is in position the portion of the active reach between the guide pulleys rides upon the operating surfaces of the recording and erasing units. The tape is further pressed against the recording and erasing units 14 by a pair of tape retainer and guide shields 44. Each tape retainer and guide shield 44 includes a cup-shaped shell tending to enclose the tape and a yieldable pad 45 within the shell which presses the tape against the recording and erasing units but permits the tape to slide laterally. The tape retainer and shields 44 are supported by suitable brackets 46 from the bottom 22 of the tape magazine, It is to be noted that the tape 32 passes over pad 35 and around all guide and supporting rollers with its coated or active face outermost.

It will be observed that the tape magazine with the endless magnetic recording tape therein may be positioned or removed relative to the tape recording and erasing units 14 and the drive spindle 7 without disturbing the tape or requiring any handling or manipulation of the tape. In order to properly position the tape magazine, suitable positioning pins 47 and a positioning stop 48 may be provided. Also in order to facilitate placement and removal of the tape magazine a handle 49 may be provided.

The operation of my tape recorder is as follows: A tape magazine with the tape intact therein is slipped into place as determined by the pins 47 and stop 48. In doing so, the idler wheel 39 urges the tape against the driving spindle 7 and the tape retainer and shields 44 urge the tape into cooperative relation with the tape recording and erasing units 14. These units are shown as provided with terminals which are, in practice, connected in a conventional manner to an amplifier unit which may be contained within the case 1, although the amplifier may be located at a remote station. Two recording and erasing units are provided for the reason that the standard magnetic sound recording tape is equipped with two recording channels. The positioning of the tape magazine on the amplifier case brings the rotatable disc 26 into engagement with the driving wheel 10.

After the tape magazine has been positioned the motor 3 is started, causing the spindle 7 to advance the active reach of the tape across the recording and erasing units 14. Simultaneously the drive wheel 10 rotates the outer periphery of disc 26 at a speed slightly faster than the rate of travel of the tape as determined by the driving spindle 7. The inner periphery of the rotatable disc 26 moves at a slower speed than the tape as the latter is withdrawn toward the pad 35. The resulting effect is that the various convolutions of the spiral portion 32 of the tape rotate with the rotatable disc 26, but move at differential velocities such that both the discharge reach 33 and return reach 42 of the tape are under slight tension. It has been found in practice that the friction imposed on the tape is quite low so that the resulting tension of the discharge and return reaches, in order to effect a continuous movement of the tape, is quite nominal and well within the strength of the conventional two-channel magnetic recording tape formed of plastic ribbon impregnated with magnetizable material.

By constructing the reel which holds the tape of adequate size, it is possible to carry a sound recording of many hours' duration if desired, although in most instances a recording of a half hour or one hour is sufficient for each channel. By proper controls associated with the recording and erasing units 14, the sound recording of either track of the tape may be amplified and produced or erased from the tape so that in the latter case the tape may be impressed with other recordings.

It will be observed that although a two-channel magnetic tape is shown, the magazine may be adapted to carry a magnetic tape of any width. Also, the other types of tape or ribbon, such as motion picture film or the like, may be handled by a reel mechanism of the type shown and described. In such case the active reach of the film is threaded through an adaption of a conventional motion picture drive permitting intermittent advance of the film frames.

The margins of the tape, film or ribbon may be slightly thicker than the central portion of the film to minimize rubbing contact, and thus protect the central portion which bears the sensible or translatable subject matter such as picture images, modulatedly magnetized recording channels, or the like.

Figures 7, 8:
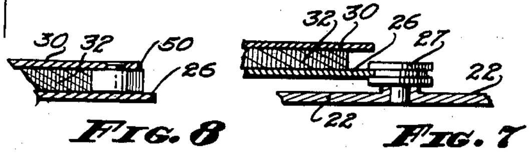
Fig. 7 is a fragmentary sectional view through 7—7 of Fig. 5.
Fig. 8 is a fragmentary sectional view similar to Fig. 7, showing a modified arrangement in which external rollers are provided to restrain the tape.

Reference is now directed to Fig. 8. In this construction a series of depending rollers 50 are arranged in equally spaced relation around the margin of the top plate 30 to constrain the spiral body of tape 32. This is particularly desirable in order to control relatively large diameter spiral coils of tape.

It should be pointed out that the invention herein disclosed has a particular application as a portable device to be used in automobiles, airplanes, motor boats, and the like since the magazine has been found to operate successfully even when tilted or placed on a moving support. In which case, for purposes of pleasure or instruction, interchangeable magazines may be inserted so that the music or information recorded on the tape may be played repeatedly. In such instances, the recording may be placed on the tape by any suitable recording means, or the units 14 may be employed for such recording purposes.

With the present invention it is possible to use magnetic tape of substantial width and of sufficient width to accommodate two, three, four or more channels of recorded material. It is further contemplated that the tape be provided with a metallic section (not shown), such as a short length of aluminum ribbon at the point constituting the termination of the recorded channels. The guide means for the tape may also include spaced contacts to be engaged and "shorted" by the metal insert to thereby provide a signal pulse to the reproducing and/or recording mechanism to effect automatic switching of the pick-up or recording heads from one channel to the next channel after each successive pass through the recording heads of the entire length of tape in the magazine.

The drawings and description hereinabove describe the central guide rollers 31 and show eight such rollers. It has been found that a great number of such rollers (at least about eight) are necessary for successful operation of the apparatus. The greater the number of rollers 31 the better, since it is desirable to provide as nearly as possible a continuous circular and movable guide at the inner periphery of the spiral roll of tape. It is important that a sufficient number of rollers 31 be provided since the run 33 of the tape is under tension and a substantial radial pressure is applied against the rollers 31 by the spiral roll of tape. That radial pressure is all applied to the relatively small areas of contact outwardly of the rollers 31 and a sufficient number of such areas must be provided to reduce the unit pressure in each to such a value that the successive convolutions of tape outwardly therefrom can slide over each other without binding. By providing a great number of rollers a greater distribution of the radial pressure is effected with increasing ease of operation. Furthermore, the greater the number of rollers, the less the angular deflection of the tape as it passes over each which results in further increasing the area over which the pressure is distributed. It is further important that the guide means supporting the inner periphery of the spiral roll of tape be movable rather than stationary to thus further reduce the friction and tendency of the tape to bind at the inner periphery of the roll. Hereinafter reference to a substantially continuous movable guide is intended to include the arrangement shown in the drawings wherein the inner guide comprises a multiplicity of rollers 31, the outer peripheries of which define the movable guide and which are present in sufficient number to hold the inner periphery of the spiral roll of tape to a shape closely approaching a true circle.

The previously described smooth and polished upper surface of the disc 26 is also important since it is imperative that the tape be freely movable relative to the disc surface with a minimum of friction. The surface of the disc 26 on which the spiral roll of tape rests must be free of protuberances or any projections that would engage the tape and retard free sliding movement thereof over the supporting disc surface. The graphite lubricant previously referred to assists in lubricating the surface of the disc 26 and further facilitates unimpeded movement of the tape edge thereover.

Having fully described my invention, it is to be understood that I do not wish to be limited to the details herein set forth but my invention is of the full scope of the appended claims.

I claim:

1. A magazine for an endless magnetic tape comprising: a housing, a disc having a smooth and polished surface rotatably mounted in said housing for rotation about a fixed axis thereon, first guide means movably mounted in said housing adjacent said axis and defining a substantially continuous movable guide concentric to said axis and overlying the central portion of said disc, an endless flat magnetic tape spirally wound about said guide means in overlying relation to said rotatable disc to define a roll thereof having an inner periphery and an outer periphery, and further guide means on said housing for guiding a portion of said tape along a fixed path from said inner periphery of said roll and along a predetermined path in said housing to the outer periphery of said roll, said disc being rotatably mounted in said housing by rollers engaging the periphery of said disc, said housing being cut away to expose a portion of the periphery of said disc for frictional engagement thereof by a driving wheel.

2. A mechanism for reproducing from an endless tape translatable means carried thereby, comprising: a base member; a translating unit mounted thereon; a drive spindle mounted on said base member, a drive wheel also mounted on said base member spaced from said spindle; means for rotating said drive wheel and spindle in unison; a tape magazine having an open side adapted to confront said translating unit and drive spindle; a tape reel in said tape magazine, said tape reel including a rotatable disc; and an endless tape including a spiral winding on said reel, a discharge reach extending from the inner periphery of said winding, an active reach extending across said open side and in cooperative relation with said translating unit and drive spindle, and a return reach extending from said drive spindle to the outer periphery of said spiral winding; said magazine being cut away adjacent the periphery of said disc, said drive wheel extending into said cut-away portion and into frictional driving engagement with the periphery of said disc.

3. A magazine for a device of the character described, said device having a power driven rotary member, said magazine comprising a housing, a horizontal disc having a smooth surface adapted to support an endless reel of flat spirally wound tape, said disc being rotatably mounted in said housing for rotation about a fixed axis thereon, said disc being driven at its periphery by engagement with the rotary member, guide means movably mounted in said housing adjacent said axis overlying the central portion of said disc, said reel being disposed about said guide means, means on said housing for guiding a loop of the tape along a predetermined path from the reel at a point adjacent said guide means to a point on the periphery of the reel.

References Cited in the file of this patent

UNITED STATES PATENTS

| | | |
|---|---|---|
| 2,288,983 | Weiss | July 7, 1942 |
| 2,499,895 | Walker | Mar. 7, 1950 |
| 2,543,483 | Barrett | Feb. 27, 1951 |
| 2,546,124 | Hart | Mar. 20, 1951 |
| 2,699,332 | MacKenzie | Jan. 11, 1955 |
| 2,778,637 | Eash | Jan. 22, 1957 |
| 2,850,278 | Simler | Sept. 2, 1958 |